Patented Mar. 5, 1935

1,993,238

UNITED STATES PATENT OFFICE 1,993,238

PROCESS OF PRODUCING GYPSUM PRODUCTS

John C. Best and Frank Lee Marsh, Medicine Lodge, Kans., assignors to The Best Brothers Keene's Cement Company, Medicine Lodge, Kans., a corporation of Kansas No Drawing. Application March 9, 1932, Serial No. 597,792

3 Claims. (Cl. 106—34)

Our invention relates to manufacture of Keene's cement and more particularly to a process for selectively producing Keene's cement of different grades from gypsum in a rotary kiln.

Keene's cement has generally been produced in a single grade by each manufacturer, in most plants by the use of stationary kilns, and loaded with chemicals for cutting down the setting time of the cement, while high grade white plaster has been produced in two or more grades by the kettle process, and fillers by various means. Further and particular objects of this invention, therefore, are to produce a number of grades of Keene's cement, high grade white plasters, and fillers of various kinds by the use of rotary kilns, and to control the distinctive characters including setting time of the several grades by adjustment of the conditions under which gypsum is prepared, for reducing the expense and time of preparing high quality gypsum products and minimizing the requirements for the use of chemicals in gypsum products, for example for adjusting the setting time of the products.

In accomplishing these and other objects of the invention, we employ new steps in the treatment of gypsum whereby new products and a variety of products of high quality exactly suited for different uses may be prepared, wherein advantage is taken of discoveries made by us of heretofore unknown effects occurring in gypsum burning process and of varying the conditions including the temperature under which gypsum is burned.

The improved process will be described as carried out by the use of rotary apparatus which, being well known, need not be illustrated or described in detail; so far as it pertains to the production of Keene's cement in rotary kilns being an improvement on the process disclosed in the U. S. Patent to Hoskins, No. 1,370,968. It is to be understood that suitable adaptations of the process obvious to those skilled in the art may be made for employing the process in other types of apparatus for preparing gypsum products.

One of our discoveries is that the quality and setting time of gypsum products can be controlled through close control of temperature used in calcining the raw material, and one of our applications of this discovery for the production of a variety of grades of Keene's cement and plaster in rotary kilns will be described first, in order to convey a clear understanding of the process.

For example of equipment and general operating conditions employed in the practice of our process, kilns to which specific conditions named apply are about 125 feet long, 8 feet in diameter, rotated at a speed of one revolution in 2½ minutes, and heated by flames of natural gas directed into the discharge ends of the kilns. Gypsum rock ground to a substantially uniform fineness to pass through a ⅛ inch mesh is delivered with the closest possible uniformity of feed, at a rate of 7½ tons per hour, into the cold end of a kiln, travels the full length of the kiln, and discharges at the firing end into a rotary cooler through which a current of air passes. The calcination period is about 2¾ hours.

An example of an efficient rotary cooler, for use under other conditions named, is one 6 feet by 60 feet, provided with lifting or sifting bars and operated at a speed corresponding to the feed of burnt gypsum, approximately one revolution in 70 seconds.

The cooled burnt gypsum is collected in storage pits from which it is taken for grinding, pulverizing and chemical treatment as later described.

The temperature of calcination is adjusted in accordance with the type of product desired, all of the examples given below being in Fahrenheit.

Temperatures of 1600° and over produce a slow-setting plaster. Temperatures between 1325° and 1550° give a filler. When temperatures between 950° and 1400° are used, Keene's cement is produced in which the setting time varies substantially proportionately to the temperature. Within the last named range, temperatures of 1275° to 1400° give a slow-setting Keene's cement, temperatures of 1150° to 1275° a Keene's cement that sets less slowly, temperatures between 1050° and 1150° still faster-setting cements, and temperatures between 950° and 1050° still more rapidly setting cements. Each of the lower ranges produces cements having particular fields of usefulness.

Temperatures between 375° and 500° give plaster with a fast set and low tensile strength; temperatures between 325° and 375°, and particularly around 325° to 350°, a normal setting plaster of high grade, for casting, molding and ornamental and industrial uses, corresponding to that produced by the second settle process in kettles, and temperatures of 290° to 325° quick setting plaster, corresponding to first settle plaster made in kettles. It is one of our discoveries that setting time of plasters does not vary in strict proportion to temperatures below about 925°, but that quick setting plasters may be produced above 350° and below 300°.

Temperatures below 300°, and particularly between 240° and 290°, produce quick-setting plaster with a low tensile strength, and particularly a monohydrate calcium sulphate, CaSO$_4$.H$_2$O, heretofore thought by chemists to be unobtainable by processes of this character. In further explanation of this novel result, we have found that while it is difficult to burn gypsum exactly to the monohydrate, if rather more water of crystallization is taken out than the formula shows, and the product is exposed to moisture, for example to atmosphere, it picks up moisture very readily and reverts within a few hours to the monohydrate containing approximately 12% water of crystallization. It has some setting properties but the set is readily broken down to form a filler for the paper and other trades.

Temperatures of 240° and lower are suitable for making material that is mixed with other products for other purposes.

Referring again to the products obtained at higher temperatures, we have found that a slow-setting plaster that may take days and even weeks to set, may be produced in a rotary kiln by controlling the conditions of burning as above described, and at temperatures above 1600°. This plaster eventually, with proper handling, becomes extremely hard and may be used for flooring purposes, for example in the place of marble.

Another of our important discoveries is that when gypsum is burned under conditions corresponding to those described, at temperatures below 1600° and above 1400°, a new material is produced, not a Keene's cement nor a by-product or intermediate, having substantially no setting properties, and adapted for use as a filler for paper, wall paper, paint, rubber and other trades. A preferred temperature for assuring removal of all trace of setting property from the ground gypsum is 1500°.

Our ability to control the production of various grades of Keene's cement, including those above mentioned, is due partly to our discovery that the setting time of Keene's cement varies substantially proportionately to the temperature between the range 925°-1400°, and that the preferred limits for producing a true Keene's cement are 950° to 1325°. With the temperature below 950°, there is the possibility of producing a plaster.

The commonly recognized characteristic of true Keene's cement, for which it is tested, is that it can be retempered, a property not possessed by any calcined plaster however doctored or otherwise treated.

We have found that another practical guide or test is whether or not the resulting product is going to develop heat during the hydration process; in other words, will it get hot in setting after being mixed with water, the way that all plaster does. Quicker setting grades of Keene's cement, for plastering and for casting, may be made by our process by burning the material as closely as possible to the temperature at which the resulting material does not generate heat during the setting process. Under the conditions named, the dead line comes at just about 950°. If the temperature drops below 900° the resulting product is not a true Keene's cement as it cannot be retempered and set up again, and it will develop heat during the setting up process. The higher the temperature from 950° to 1400°, the slower setting the Keene's cement will be, all other factors being equal.

Close control of temperature in burning Keene's cement by our method is also advantageous in view of another property of the cement so produced, that the higher the temperature at which the cement is made, the lower the water ratio, or percentage of water to dry weight of cement required to confer a given consistency.

The discoveries of the controlling effect of temperature, of the minimum temperature under conditions named at which true Keene's cement may be produced, and of the fact that the setting time diminishes with reduction of temperature, have enabled the production of new varieties of Keene's cements adapted for many different uses. The new varieties include cements that, without accelerators, set much quicker than any Keene's cement has ever been known to do, and can be troweled down to a finish in the same time as an ordinary plaster and lime finish coat instead of having to wait several hours before troweling.

A catalyst is added to any grade of Keene's cement, to give surface hardness, a positive set, and similar valuable qualities. But an important feature of our discoveries is that the same catalyst may be used in the same proportions throughout a series of grades made at different temperatures, and a variety of setting times may thus be secured through controlling the one factor of temperature, all others being uniform.

When the process above described is used with longer rotary kilns, the feed per hour may be heavier than stated, the revolution slower and the temperatures somewhat lower, the reverse holding true for shorter kilns. In the use of rotary kilns, if speed of rotation is increased, the material passes through the kilns more rapidly and if the speed is decreased the material stays in the kilns longer. In general the speed is increased to take a bigger feed and to pass the material through more quickly, and decreased to obtain the opposite results.

Rotary kiln speed is also varied according to the fineness of the rock, being decreased for a more finely ground gypsum and increased for the coarser ground. It is feasible, for example, to burn rock up to 1½ inches and obtain satisfactory products as above described, and in some cases up to 2½ inches, when higher temperatures are used, for example from 900° upward, though substantially uniform calcination may not be obtained on the largest sizes mentioned. At the lower temperatures, particularly from 500° down, a fine rock, for example ⅛ inch and finer, should be used to secure thorough calcination of the individual particles.

All of these conditions, and others known to those skilled in the art, may be taken into consideration in determining the temperature to which a particular lot of gypsum should be subjected for producing a particular grade or type of Keene's cement or plaster. The minimum temperature at which a true Keene's cement may be produced may vary from 950° because of variance in one or another factor, for example duration of calcination, from the conditions above described. But when the base line or minimum temperature has been ascertained for a particular group of conditions, measured increases in temperature will effect the production of a great variety of products, each upward step in temperature producing a slower setting cement, and the rates of setting of the cements being substantially proportionate to the temperature increases above the minimum.

Different grades of cement and plaster may also be produced in accordance with this invention under one temperature, by varying one of the other factors, for example the duration of calcining. It is apparent that the process may be used with other apparatus than rotary kilns, for example in stationary kilns where most of the factors above mentioned, particularly particle size and duration of calcination, would be given consideration for determining basing temperatures and varying temperatures, to produce a variety of products each setting in a predetermined time, including fast setting cements not requiring loading with chemicals to bring about the quick set.

As an example of variation of factors to produce conditions under which products may be obtained at temperatures different from those specified, a Keene's cement may be made at temperatures between 700° and 900° on the 125 foot kiln mentioned by cutting down the speed of revolution and the rate of feeding material. The material is thus held for a longer calcination period at the lower temperatures than would normally be given at the temperatures above 900° in the use of the apparatus previously described. Similarly in the lower part of the range 500°–900°, plaster can be made by increasing the speed of the kiln and the feeding of material so that the material is subjected to higher temperatures for a shorter period than in the case of the temperatures given in the example in making plaster. The feed may be increased to 13 tons per hour at the lower temperatures, when much of the gypsum is in the form of fine dust, without requiring speeding up of the kiln to an undesirable extent.

Attention is further called to the fact that this invention enables the production of higher grades of plaster, namely, white plaster grades for casting, molding, finishing and gauging, and dental and pottery plasters, and the like, on rotary kilns, whereas this has heretofore been considered entirely impossible or wholly impractical.

The close control of temperatures and of duration of heating, as disclosed above, brings about the new results. Control of the several factors in burning also brings it about that grades of white plaster with a higher compression and tensile strength than ordinarily expected of these plasters can be produced on rotary kilns.

The calcined gypsum obtained from a kiln is cooled by any suitable means, for example being passed through a rotary cooler as referred to above.

We have discovered and devised a new step, however, for treating plasters, to further assure highest quality, and provide for the production of high quality white plasters by means of rotary kiln apparatus. Our improved step in plaster making is based on the idea that plasters, in order to reach their highest quality, require not merely calcination but a certain period of soaking afterwards to permit the heat to penetrate evenly to the center of each individual particle. The time during which the gypsum is in a rotary kiln must be limited in accordance with conditions above outlined to obtain a specific product, and the quality obtained by soaking cannot be conferred by adjusting the period or temperature of calcining. The ordinary cooling step would extract heat relatively quickly from the plaster and prevent adequate soaking.

We, therefore, provide a rotary cooler having no lifting bars, for example removing the lifting bars from a rotary cooler normally receiving calcined gypsum from a rotary kiln, run the hot calcined plaster into the cooler, and operate the cooler more slowly than in the case of ordinary rapid cooling of cement. The intake and outflow of plaster are measured and constant, no forced air current being passed through the apparatus, the plaster is retained in the apparatus for a sufficient period under heat to enable the heat to permeate all particles.

The calcined gypsum product, after passing through the rotary cooler, is ready for grinding, and may be stored. It may be ground or pulverized to a fineness suitable for a particular use. Calcined gypsum ground to pass 150 mesh is satisfactory for most grades of white plaster and for some grades of cement.

On the other hand, we have found that grinding of calcined gypsum produced at temperatures between 1325° and 1600° will provide a novel product having special values for various uses, with or without chemical treatment, for example as a filler, without any chemical treatment. The gypsum produced in the temperature range named is ground to a fineness of 250 to 350 mesh. Attention is called to the fact that the range 1325° to 1600° includes the temperatures between 1325° and 1400° for making Keene's cement grades having the weakest and slowest sets, and the temperatures between 1400° and 1550° adapted to assure elimination of setting properties.

We have found that gypsum calcined to provide specific products, such as quicker-setting plastering grades of cement, and gauging and finish grades of plaster having a normal set, are better adapted for their purposes when more coarsely ground, whereby the material will cut more readily into lime putty.

A further aspect of the invention has to do with the tendency of calcined gypsum products to swell when mixed with water so that the resulting set cement is puffy and porous. The swelling occurs by reason of the fact that all gypsum contains a small proportion of calcium carbonate. The catalysts generally used to accelerate the setting time of a Keene's cement which may be too slow setting in a normal state, are acid chemicals, for example some form of alum. The acidity of the chemical reacts with calcium carbonate to liberate $CO_2$, and this causes the swelling and porosity of the cement.

Among the means heretofore employed for counteracting this tendency have been the addition of .2 to .5 per cent of hydrate of lime to the burnt product, the use of a setting agent more strongly acid than the potash-alum ordinarily employed, and grinding the burnt product to an unusually fine state of subdivision, for example 150 mesh, all of which expedients are disclosed in said patent to Hoskins. The expedients act by speeding up the reaction between the setting agent and the burnt material, thus disposing of the products of the reaction before the material is used.

It has been suggested heretofore that swelling of Keene's cement, particularly when produced in rotary kilns, was due to surface sintering, fluxing or fusing, of particles, including conversion of calcium carbonate on the surfaces of particles to calcium oxide, whereby action of acid on calcium carbonate content of the particles, when the cement is mixed with water, is delayed. We have discovered, however, that calcium oxide is produced in a rotary kiln not only by conversion of calcium carbonate but by reduction of portions of the gypsum or calcium sulphate to an oxide. When fine gypsum dust passes through the flame in a rotary kiln, part of the sulphate is drawn off. The dust carried away by the flues has a substantially higher lime content than the product and higher than could be accounted for by conversion of carbonate to oxide. The excess of calcium oxide resulting from conversion of both sulphate and carbonate, close control of production of $CO_2$ could better be effected by retarding or limiting rather than by accelerating reaction between the acid of a catalyst and the carbonate, and by minimizing rather than increasing the amount of $CO_2$ liberated in the water mixture.

One of our methods of minimizing production of $CO_2$ is to so adjust the catalyst and the material that there is relatively little reaction on calcium carbonate, for example by selecting gypsum from a deposit very low in calcium carbonate when an acid catalyst is to be used. The setting agent may therefore act completely on the comparatively small amounts of calcium carbonate before the cement starts to set.

We have also found that swelling may be prevented by the use of a catalyst or chemical just sufficiently acid to neutralize the free lime present or created in the material, but without any excess acidity that would react with the calcium carbonate content that is left in the material.

The possibility of reaction between a catalyst and calcium carbonate may be avoided entirely, however, by using a neutral catalyst such as potassium sulfate containing no free acid. We prefer to use a neutral catalyst and thus obviate the necessity for providing for the neutralization either of an acid catalyst or of free calcium oxide in the calcined product.

The use of a neutral catalyst, specifically potassium sulfate, in Keene's cement is disclosed in Patent No. 1,304,148, issued to one of the present applicants, John Carter Best, May 20, 1919. In said patent, however, the neutral catalyst was designated for use in the so-called superfine grade of Keene's cement adapted for artificial marble, to give a slow setting time and prevent effect of colors mixed with the cement. It is one of our important new discoveries that a neutral catalyst may be used in all grades of Keene's cement to avoid the swelling of cement during the final set.

Referring again to Keene's cement, another aspect of the invention consists in controlling the rate of set when the set is too rapid. A grade of cement produced at relatively low temperatures, for example around 950° to 1000°, for particular uses, is generally mixed with substantially an equal volume of lime putty. The cement must have a quick set in order to set up fairly rapidly when mixed with such a large volume of a material that has practically no setting qualities. It is desirable, therefore, to smoothly gauge the Keene's cement with water before it is cut into the lime putty, but it is also necessary to prevent the cement from setting up while it is being mixed with water only. We have found that when a small amount of hydrated lime, in the proportion of about 5%, is added to the cement, the initial set of the cement is slightly retarded, lumping is avoided, but the final set is not interfered with. The cement will still have the desired quick-set after it is mixed with the lime putty and put on the walls.

Attention is called to the fact that the lime is added in substantially larger proportions than the .2% to .5% heretofore known to be useful for neutralizing an acid catalyst to prevent the swelling of the cement, and for a different purpose, namely, to delay the initial stiffening that takes place before the final set. Keene's cement is ordinarily mixed with lime to form a mortar for plastering, and the addition of the hydrate of lime previous to making the mortar will, therefore not change the properties of the mortar. The amount of lime in the putty to which the cement is added may be adjusted in view of the addition of hyrate to the cement.

In view of the above description, it is apparent that we are able to secure a wide variety of products from the same raw material, by our novel expedients of changing the feed, speed, temperature and other factors of calcination of gypsum and the chemical treatment of the rock burnt under the novel conditions. The new process steps produce products such as grades of Keene's cement and plasters particularly adapted for specific uses, and not heretofore obtainable, and assure the economical production of gypsum products of high quality in rotary kilns.

What we claim and desire to secure by Letters Patent is:

1. The process of producing Keene's cement selectively as to grade based on setting time of the cement, including calcining gypsum in a rotary kiln at a temperature between approximately 950° and 1400° F., corresponding to the final setting time of a selected grade of the finished product of the kiln.

2. The process of producing Keene's cement selectively as to grade based on setting time of the cement, including calcining gypsum in a rotary kiln at a temperature between approximately 950° and 1400° F., corresponding to the final setting time of a selected grade of the finished product of the kiln, and under time and speed conditions substantially constant for all of the several grades produced by burning of the gypsum within said temperature range.

3. The process of producing Keene's cement including calcining gypsum in a rotary kiln at a temperature between approximately 950° F. and 1400° F., and graduated above or below approximately 1175° F. inversely to rapidity of desired set of finished product of the calcination.

JOHN C. BEST.
FRANK LEE MARSH.